(12) United States Patent
Misikangas et al.

(10) Patent No.: US 8,270,994 B2
(45) Date of Patent: *Sep. 18, 2012

(54) APPLICATIONS OF SIGNAL QUALITY OBSERVATIONS

(75) Inventors: Pauli Misikangas, Helsinki (FI); Lare Lekman, Helsinki (FI)

(73) Assignee: Ekahau, Oy, Helsinki (FI)

( * ) Notice: Subject to any disclaimer, the term of this patent is extended or adjusted under 35 U.S.C. 154(b) by 1697 days.

This patent is subject to a terminal disclaimer.

(21) Appl. No.: 11/029,642

(22) Filed: Jan. 6, 2005

(65) Prior Publication Data

US 2005/0181804 A1    Aug. 18, 2005

Related U.S. Application Data

(63) Continuation of application No. PCT/FI03/00554, filed on Jul. 8, 2003.

(30) Foreign Application Priority Data

Jul. 10, 2002 (FI) .................................. 20021356

(51) Int. Cl.
*H04W 24/00* (2009.01)
(52) U.S. Cl. ............... 455/456.2; 455/226.2; 455/226.3; 455/423; 455/446; 455/456.1; 455/457; 370/328; 370/338
(58) Field of Classification Search ............... 455/456.1, 455/457, 456, 226.2, 226.3, 423, 446; 370/328, 370/338
See application file for complete search history.

(56) References Cited

U.S. PATENT DOCUMENTS

| | | | |
|---|---|---|---|
| 5,471,650 A | 11/1995 | Vexler et al. | |
| 6,246,861 B1 * | 6/2001 | Messier et al. | 455/12.1 |
| 6,269,246 B1 | 7/2001 | Rao et al. | |
| 6,330,431 B1 | 12/2001 | Rostamy et al. | |
| 6,393,294 B1 * | 5/2002 | Perez-Breva et al. | 455/456.5 |
| 6,782,265 B2 | 8/2004 | Perez-Breva et al. | |
| 6,947,753 B2 * | 9/2005 | Bayder | 455/456.1 |
| 7,149,531 B2 * | 12/2006 | Misikangas | 455/456.1 |
| 7,333,816 B2 * | 2/2008 | Filizola et al. | 455/456.1 |
| 2002/0107029 A1 * | 8/2002 | Caughran et al. | 455/456 |
| 2004/0203437 A1 * | 10/2004 | Burch et al. | 455/67.11 |

FOREIGN PATENT DOCUMENTS

| | | |
|---|---|---|
| EP | 0 240 051 A1 | 10/1987 |
| EP | 1 022 578 A2 | 7/2000 |

* cited by examiner

*Primary Examiner* — Amancio Gonzalez
(74) *Attorney, Agent, or Firm* — Barnes & Thornburg LLP

(57) ABSTRACT

A method and apparatus for using at least one signal quality parameter in an application. A target device makes observations of at least one signal quality parameter in a wireless communication environment. Because there are gross differences between different target devices' observations, there are one or more device models that compensate for the differences. A selection logic selects an optimal device model for each target device. The observations made by the target device are processed with the selected device model and applied to an application, such as a positioning application or network planning.

18 Claims, 3 Drawing Sheets

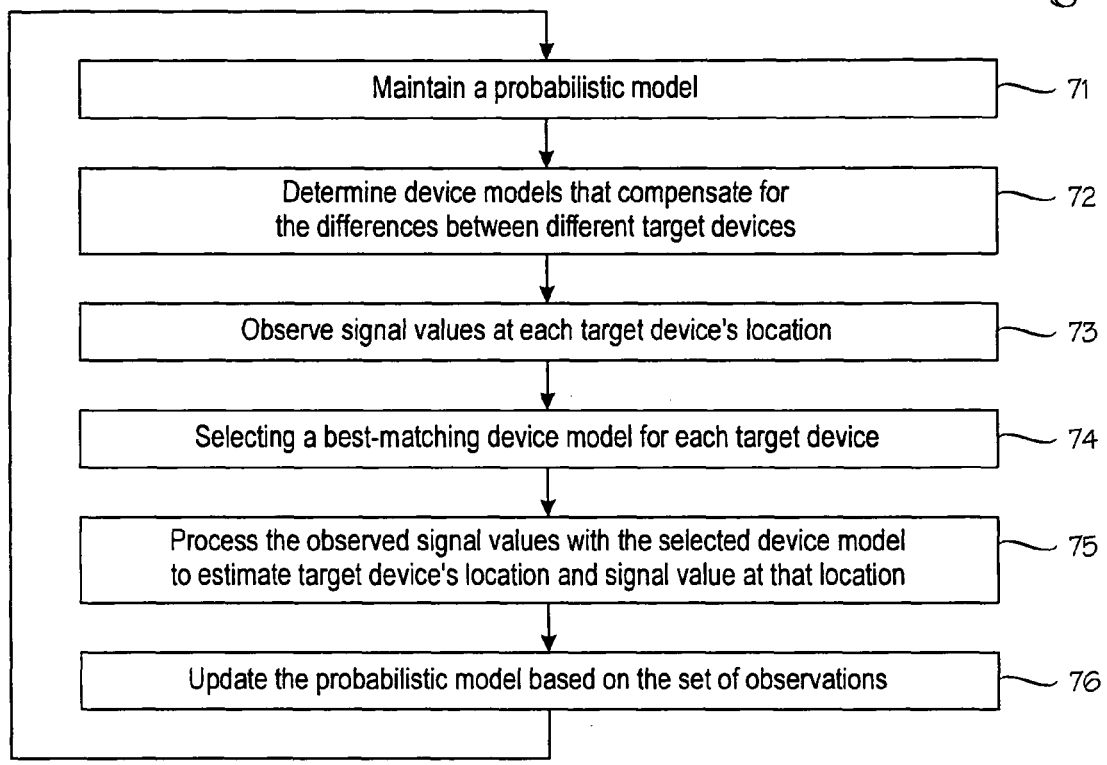

APPLICATIONS OF SIGNAL QUALITY OBSERVATIONS

This is a Continuation application of International Application No. PCT/FI03/00554, filed Jul. 8, 2003, which relies on priority from Finnish Application No. 20021356, filed Jul. 10, 2002, the contents of both of which are hereby incorporated by reference in their entireties.

BACKGROUND OF THE INVENTION

The invention relates to practical applications of signal quality observations in a wireless communication network. Signal quality observations are primarily used to select a cell or base station in a wireless communication network. The invention is particularly related to other uses of signal quality observations, such as mobile positioning and network planning.

It has recently been discovered that observations of signal quality, such as signal strength, bit error rate/ratio, signal-to-noise ratio, and the like, can be used to locate a mobile communication device. As used herein, the term 'target device' refers to a mobile communication device whose location is to be determined.

FIG. 1 schematically illustrates an example of such a positioning technique. A target device T communicates via base stations BS via a radio interface RI. In this example, the communication is assumed to be radio communication. The target device T observes signal values at the radio interface RI. The observations O are applied to a probabilistic model PM that models the target device's wireless communication environment and produces a location estimate LE. As used herein, a target device is a device whose location is to be determined. The target device communicates via signals in a wireless environment, and signal values in the wireless environment are used for determining the target device's location. For example, the target device may be a data processing device communicating in a wireless local-area network (WLAN). The data processing device may be a general-purpose laptop or palmtop computer or a communication device, or it may be a dedicated test or measurement apparatus such as a hospital instrument connected to the WLAN. A location, as used herein, is a coordinate set of one to three coordinates. In some special cases, such as tunnels, a single coordinate may be sufficient but in most cases the location is expressed by a coordinate pair (x, y or angle/radius).

Mobile communication devices measure signal quality parameters. A good example of a signal quality parameter is signal strength. An acronym RSSI is frequently used to refer to a received signal strength indicator. The RSSI is used, for example, to select a cell or base station.

A problem associated with the above-described prior art technique is the fact that many mobile communication devices measure the signal strength or RSSI rather poorly. The primary use of the RSSI is to select an optimal cell or base station, and a rather coarse measurement suffices for that purpose. When the RSSI (or any other signal value) is used for positioning or network planning, far better accuracy is desired. Further, as the primary use of the RSSI is to select an optimal cell or base station, the RSSI measurement may be grossly inaccurate when the signal strength is high, because in such a situation there is no need to change the serving cell or base station. A related problem is encountered in network planning and/or maintenance.

BRIEF DESCRIPTION OF THE INVENTION

An object of the present invention is to provide a method and an apparatus for implementing the method so as to alleviate the above disadvantages. In other words, the object of the invention is to improve the signal quality observations of mobile communication devices. The object of the invention is achieved by the methods and equipment which are characterized by what is stated in the independent claims. The preferred embodiments of the invention are disclosed in the dependent claims.

The invention is based on the idea of device models that model the target devices' signal quality observations. The target device makes observations of at least one signal quality parameter, such as signal strength, in its wireless communication environment. The observations made by the target device are processed with the device model and the processed observations are applied to an application. The application is any application that benefits from improved accuracy of signal quality observations. For example, the application can be a positioning application, network planning/maintenance, or the like. An optimal device model is selected for the target device based on some criteria. For example, the target device type can be identified and a matching device model can be selected based on the identification. If the target device type cannot be determined, several device models can be tried until one is found that results in probable location estimates and/or transitions between the estimated locations. The result of the selection may be cached for future use.

The device model selection can be implemented as a compact location estimation module that comprises several device models and a selection logic for selecting an optimal device model. Alternatively, it can be implemented as a distributed arrangement which stores several device models of which one is downloaded to the target device itself so that the target device is better able to estimate its own location or report corrected observations to a location estimation module in a fixed part of the network.

In a positioning application, the device model improves positioning accuracy and/or reliability. By virtue of the invention, the same probabilistic model can be used for a wide range of target devices because the variations between different target devices are largely eliminated by the device models.

In a network planning and/or maintenance application, the invention improves the network planning and/or maintenance application's ability to predict network parameters, such as quality-of-service (QoS), throughput or the like, in connection with different communication devices. For example, a network planning operator may determine that a given QoS is reachable in a given area with a good communication device but not with a poor one.

The device model can be expressed mathematically as follows. In order to make signal strengths measurements with different WLAN card types $C_1, \ldots, C_n$ comparable with each other, we need to define a set of functions $g_i(x)=y$, $i=1 \ldots n$, so that function $g_i$ converts a signal value x measured with card type $C_i$ to a "standardized" signal value y. In other words, $g_i(x_i)=g_j(x_j)$ means that signal value $x_i$ measured with card $C_i$ corresponds to signal value $x_j$ measured with card $C_j$.

It would seem natural to think that the differences between different communication devices are eliminated by simple factors or multipliers. For instance, a device that reports an RSSI of 20 units at location at which the correct value is 30 units would have a factor of 1.5. Surprisingly, the inventors have discovered that such a simple factor or multiplier is not sufficient for most of today's communication devices, such as WLAN cards. This is because the error is far from linear. Indeed, if the true signal strength increases continuously, the RSSI reported by most WLAN cards resembles a step function with grossly uneven steps. Moreover, WLAN cards of the same manufacturer deviate from each other, even within a single manufacturing batch. Thus the functions $g_i$ are typically much more complicated than simple multipliers or elegant mathematical functions, such as polynomials. In practice, the device models are best described by step functions.

What makes determination of the device models even more difficult is the fact that it is very difficult to arrange precisely known conditions for calibration. Theoretically, all that is needed is a well-equipped radio frequency laboratory which should be owned by every communication device manufacturer. But a real-life problem is that such facilities are rarely available to companies providing practical applications of signal value observations, such as positioning or network planning. Also, it is impossible to install two communication devices at exactly the same location, and if two devices are installed at the same location at different times, the conditions are likely to change in between.

Accordingly, the device model is preferably based on a statistical model of multiple observations. A preferred form of the statistical model is based on a cumulative distribution function of signal quality values. A benefit of the cumulative distribution function is that it is automatically monotonous.

Thus in a generic environment in which the communication devices are from several manufacturers and manufacturing batches, the device models pose a tremendous logistical problem: how is it possible to maintain device models for all brands of communication devices? This problem may be alleviated by maintaining type- or brand-specific device models, and the type or brand of the communication device is determined when the device logs in to the network. Alternatively, the device type may be determined on the basis of an inquiry to some equipment register. A preferred form of the device model comprises a type-specific device model and a unit-specific device model. The type-specific device model is a complex one, typically based on a statistical model of multiple observations. On the other hand, the unit-specific device model can be much simpler, such as a simple polynomial or a single coefficient.

However, one can expect that in the future the device models can be simpler than today. Today, the device manufacturers have little or no incentive to measure RSSI (or other signal values) accurately, as long as the communication device knows when the RSSI drops so low that a cell change is in order. In the future, when the RSSI measurements are more widely used for applications other than cell change, such as for positioning applications, the RSSI measurement abilities of the devices are likely to improve, and the device model can approach a simple polynomial, or in extreme cases, a single coefficient.

According to another preferred embodiment, a positioning application comprises multiple different device models and selects the device model that best matches the target device in question. A natural question is: how does the positioning application know which device model provides the best match for the target device in question? An elegant answer to this question is that the best-matching device model is selected on the basis of the target device's known location. For instance, assume that the positioning application is based on a WLAN network in a building. Buildings typically have well-defined entry and exit points (doors). When a client enters the building, one device model would place the client at the entry point, whereas others would place the client at other locations in the building. The model that places the client at the entry point when the client logs in to the building's WLAN network is apparently the best-matching device model.

According to yet another preferred embodiment of the invention, the result of the best-matching device model selection is cached for future use. This embodiment can be beneficial, for example, in cases where there are several alternative entry points but only one or a few exit points. Thus a client's location can be known with certainty at a checkout point, and a best-matching device model can be selected. But after the checkout point the client's location is irrelevant. If the knowledge on the best-matching device model is stored in a cache, the best-matching device model can be immediately selected next time the client enters the premises.

Another way of selecting the best-matching device model is based on databases, such as a network's subscription or equipment register, indicates a given target device's type and another database indicates an optimal device model for that type.

BRIEF DESCRIPTION OF THE DRAWINGS

In the following the invention will be described in greater detail by means of preferred embodiments with reference to the attached drawings, in which FIG. 1 schematically illustrates a positioning technique;

FIG. 7 summarizes a method for estimating a target device's location by means of a selected device model.

DETAILED DESCRIPTION OF THE INVENTION

Figure 1:
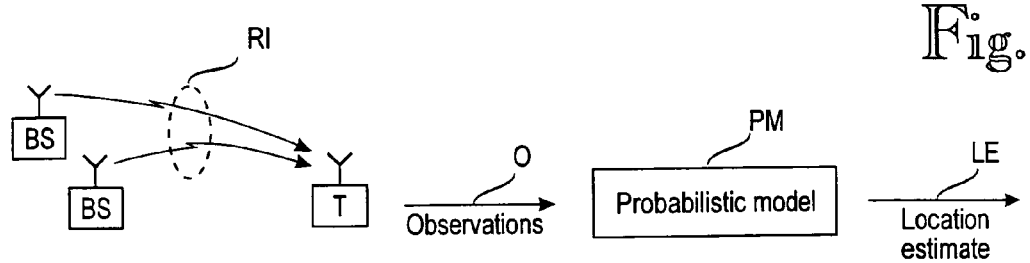
Figure 2:
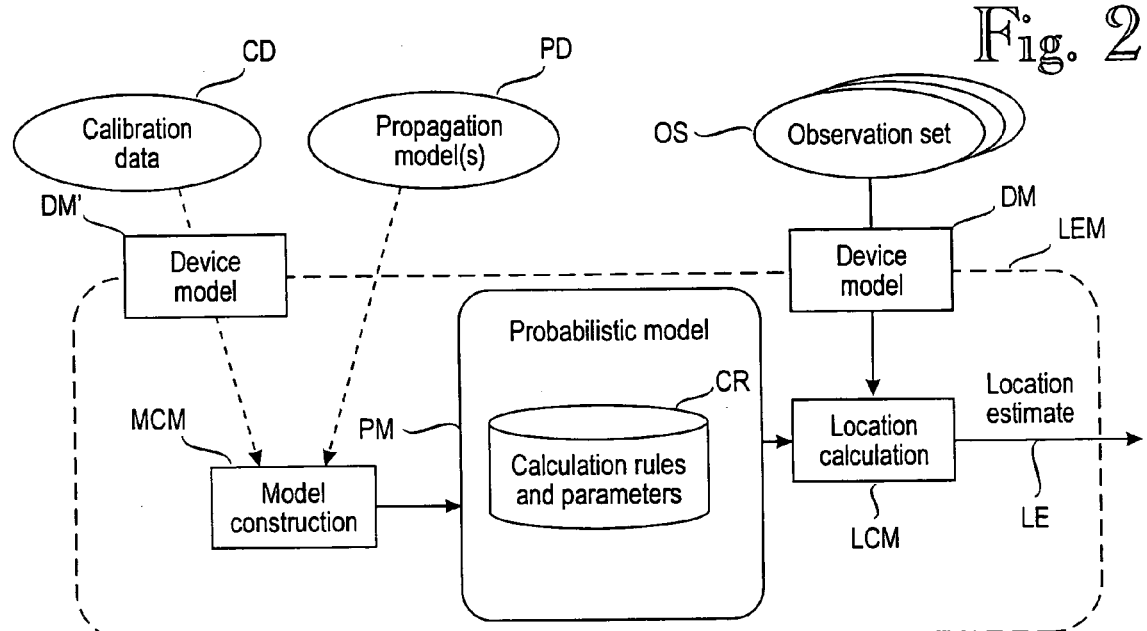
FIG. 2 shows a location estimation module LEM for estimating the target device's location based on signal values at the radio interface RI.

FIG. 2 is a block diagram of an exemplary location estimation module LEM for estimating the target device's location based on signal values at the radio interface RI. FIG. 2 shows a compact location estimation module LEM, but more distributed embodiments are equally possible. An essential feature of the location estimation module is a probabilistic model PM of the target device's wireless environment, the probabilistic model being able to predict the target device's location given a plurality of observations from the radio interface. In this example, the probabilistic model PM is built and maintained by a model construction module MCM. The model construction module MCM builds and maintains the probabilistic model on the basis of calibration data CD or propagation data PD in the form of one or more propagation models, or any combination thereof. Calibration data CD is the result of physically measuring signal values at known locations (or determining the coordinates of those locations if they are not known by other means). Optionally, the calibration data records may also comprise the time at which the observation was made, in case the signal parameters vary with time. Instead of the calibration data CD, or in addition to them, one or more propagation models PD can be used to model the radio interface RI. The propagation models can be constructed by techniques that are analogous to ray-tracing techniques for visual simulation. The locations at which calibration measurements are collected are called calibration points. The calibration data CD comprises data records each of which comprises the location of the calibration point in question and the set of signal parameters measured at that calibration point. The location can be expressed in any absolute or relative coordinate system. In special cases, such as trains, highways, tunnels, waterways or the like, a single coordinate may be sufficient, but normally two or three co-ordinates will be used.

There is also a location calculation module LCM for producing a location estimate LE on the basis of the target device's observation set OS and the probabilistic model PM. For instance, the location calculation module can be implemented as a software program being executed in a laptop or palmtop computer.

In order to compensate for the differences between different signal quality observations, the target device's observation set OS is applied to the location estimation module LEM via a device model DM. In practice, there will be many different device models, and an appropriate one will be selected based on some logic, as will be described later in more detail. FIG. 2 shows an embodiment in which the calibration data CD is also applied to the model construction module via second device model DM'. The second device model DM' is basically similar to the first device model DM and permits input of calibration data CD from different calibration devices. On the other hand, if all calibration data CD is collected with a single calibration device, or with multiple matching calibration devices, the second device model DM' may be superfluous.

Figure 3:
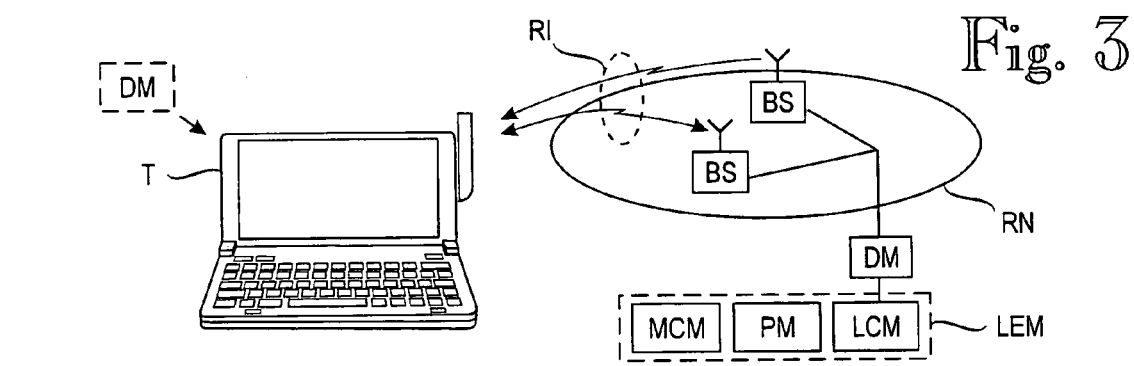
FIGS. 3 and 4 are block diagrams illustrating typical target devices whose location is to be determined.

FIG. 3 is a block diagram illustrating a typical target device T whose location is to be determined. In this example, the target device T is shown as a portable computer that communicates via a radio network RN. For example, the radio network can be WLAN (wireless local-area network) network. In the embodiment shown in FIG. 3, the location estimation module LEM comprising the probabilistic model PM is not installed in the target device T. As a result, the target device T must send its observation set OS to the location estimation module LEM via one or more of the base station BS it is connected to. The location estimation module LEM returns the target device its location estimate LE via the radio interface RI.

Figure 4:
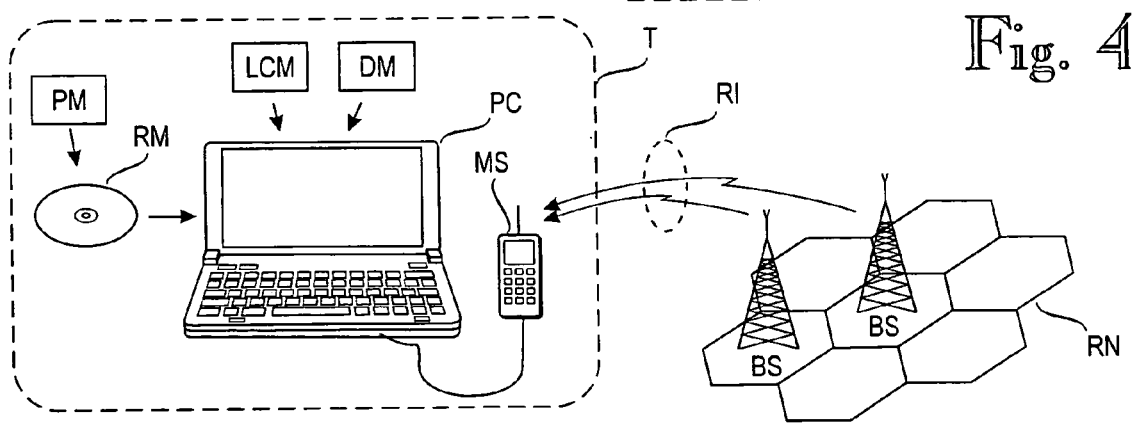

FIG. 4 shows an alternative embodiment in which the target device's attached computer PC receives a copy of the probabilistic model PM on a removable memory RM, such as a CD-ROM disk, and the target device T is able to determine its own location without transmitting anything. As a yet further alternative (not shown separately), the attached computer PC may receive the probabilistic model via an Internet (or any other data) connection to the location estimation module LEM. Wideband mobile stations can receive the probabilistic model via the radio interface RI. A hybrid of the technologies may also be used such that the receiver receives an initial probabilistic model via a wired connection or on the removable memory, but later updates to the model are sent via the radio interface.

In both embodiments shown in FIGS. 3 and 4, the device model DM is needed by the location calculation module LCM. Accordingly, in the embodiment shown in FIG. 3, the device model DM is preferably located in the fixed network, in connection with the location calculation module LCM. This placement of device model minimizes resource consumption in the target device T. Alternatively, the device model DM can be installed in the target device T. This placement of device model makes all target devices virtually identical from the point of view of the location calculation module LCM. In the embodiment shown in FIG. 4, the device model DM must be installed in the target device T because the location calculation module LCM is in the target device. For example, the device models DM can be downloaded from a web site (not shown separately), prior to using the target devices in a positioning application. If the device model is installed in the target device itself, the act of selecting an optimal device model among the multiple device models means selecting which device model to download.

Figure 5:
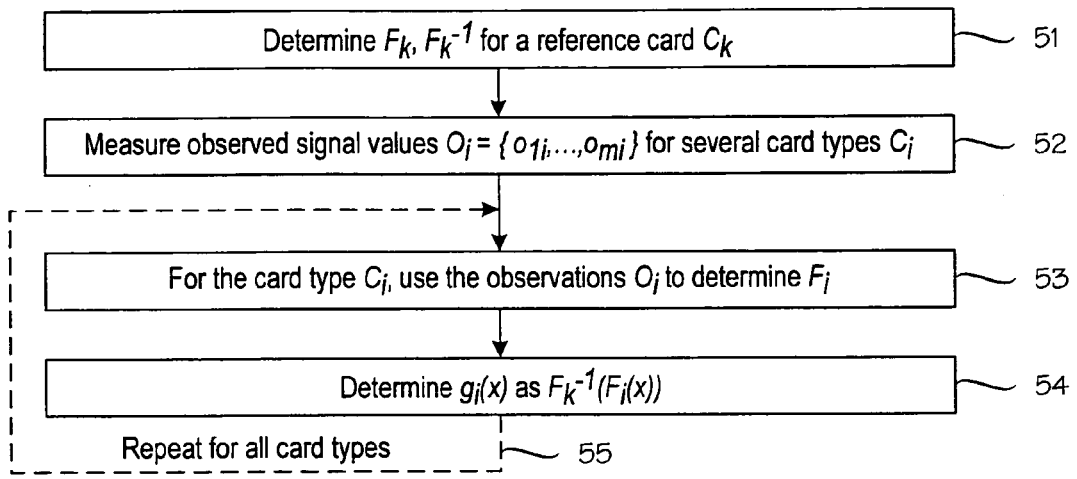
FIG. 5 illustrates a process for determining device models.

FIG. 5 illustrates a process for determining preferred implementations of the device models DM. As stated above, the device model is preferably based on a statistical model of multiple observations. A preferred form of the statistical model is based on a cumulative distribution function of signal quality values. For example, the cumulative distribution function can be determined and used as follows. The following description is written under the assumption that the signal values are measured by a WLAN card, but the description is applicable to other types of communication devices.

Signal values are measured at a fixed test location L with each card type separately, one card type at a time. The observations produce a sequence of observed signal values $O_i = \{o_{li}, \ldots, o_{mi}\}$ for each card type $C_i$. Using these observations, we can define the function $g_i$ as follows.

The idea is to define that $g_i(x_i) = g_j(x_j)$ if the relative frequency of signal value $x_i$ measured with card $C_i$ is equal to the relative frequency of $x_j$ measured with card $C_j$. The relative frequency of x means the percentage of observed signal values less than x. For instance, let 30% of signal values measured with card $C_i$ be less than 19 (a plain number, units discarded) whereas with card $C_j$, 30% of the values are less than 27. Now, according to the definition above, $g_i(19)$ is equal to $g_j(27)$.

After the functions $g_i$ are defined, the calibration and positioning can be made to work with different card types. We have to select some reference card type $C_k$ that defines the scale of standardized signal values. The signal values of other cards are converted to the signal value scale of $C_k$ before using the values for positioning and/or calibration. The selection of the reference card type does not really affect performance, but for practical reasons it is wise to select a card that is known to have good quality (produces robust signal values).

Let $F_i$ be the cumulative probability distribution function generated using observations $O_i$, so that $F_i(x)$ returns the probability for observing a signal value less than x with card $C_i$ at location L. Let $C_k$ be the selected reference card, $F_k$ its cumulative probability distribution function, and $F_k^{-1}$ the inverse function of $F_k$. The conversion function $g_i$ for card $C_i$ can be defined as: $g_i(x) = F_k^{-1}(F_i(x))$. Obviously, the conversion function of the reference card $C_k$ is: $g_k(x) = x$.

Because we are only interested in comparing the relative frequencies of signal values with different cards, we can safely combine signal value data from several test locations and signal sources. In practice, the signal sources are base stations, also called access points. For example, we can measure signal strengths of eight access points at five different locations and use all observed values to generate the cumulative probability distribution functions. In fact, using several access points and test locations is beneficial because it results in more robust conversion functions than if only one test location/access point was used. However, one must ensure that identical measurements are made with each card type.

The above process is summarized in FIG. 5 as follows. In step 51, the $F_k$, $F_k^{-1}$ are determined for the reference card $C_k$. In step 52, observed signal values $O_i = \{o_{li}, \ldots, o_{mi}\}$ are measured for several card types $C_i$. In step 53, the observations $O_i$ are used to determine the cumulative probability distribution function $F_i$ for the card type $C_i$. In step 54, the $g_i(x)$ is determined as $F_k^{-1}(F_i(x))$. As shown by the dotted line 55, steps 53 and 54 are repeated for each different card type.

It is not strictly necessary to use a real reference card $C_k$. Instead, the observed signal values can be scaled to any arbitrary scale, such as from zero to one. However, users may feel more confident using the scale of a known reference card than an arbitrary scale.

Figure 6:
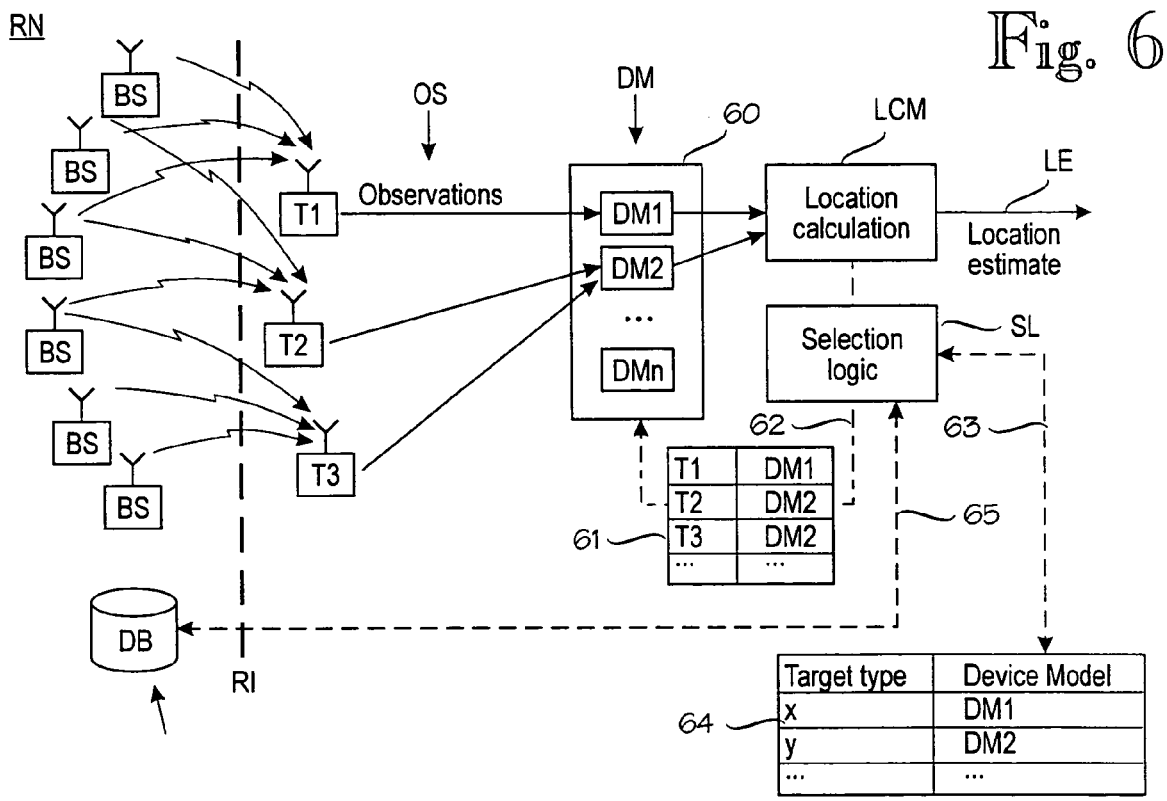
FIG. 6 shows a selection logic for selecting among several alternative device models.

FIG. 6 shows a selection logic for selecting among several alternative device models. FIG. 6 shows a radio network RN comprising several base stations BS. Three target devices, T1 through T3, communicate with the base stations BS. The target devices send their observation sets OS to the location calculation module LCM. Reference number 60 denotes a set of different device models DM. The embodiment shown in FIG. 6 comprises a selection logic SL for selecting an optimal device model for each target device. Reference number 60 denotes a data structure (table) that indicates the device model currently considered optimal for each target device. As shown by the dashed arrow 62, the data table 60 is used to select a device model for each target device. In this example, device model DM1 is used for target device. T1, whereas device model DM2 is used for target devices T2 and T3. (In reality, the target devices send their observation sets OS via the base stations, as shown in FIG. 3, but FIG. 6 has been simplified in this respect to more clearly show the relationship between the different target devices and device models.)

How does the selection logic SL know which device model is optimal for each target device? One solution to this problem is based on the target device's type. As shown by dashed arrow 63, the selection logic SL may use a data table 64 that indicates an optimal device model for each target device type, such as a mobile station or WLAN card of a specific model and, optionally, manufacturing batch or date. The selection logic SL may determine the target device type on the basis of an inquiry 65 to a database DB in the radio network RN. For instance, the database DB may be a subscription or equipment register in the radio network, and the database stores each target device's type. As an alternative to relying on a radio network database DB that stores each target device's type, the positioning application may use an internal database (not shown separately) into which the device type is stored when the device is registered as a client to the positioning application. Yet further, the device type may be determined on the basis of a login message if the login message indicates the device type.

In a WLAN environment, a device's MAC (media access control) address indicates its manufacturer, and this information may be used to select an optimal device model.

In some cases, knowledge of the target device's type may not be available. Then the positioning application may simply try several device models, one at a time, and check which device model gives the best positioning results. For example, the selection of the best device model may be based on the target device's known location, such as a well-defined entry point. In some cases, the target device's location is known with certainty only later, such as at an exit point, escalator or the like. Thus it is beneficial to cache the data structure 61 for future use so that the best-matching device model can be immediately selected next time the same target device is encountered.

Even if no single location is known with certainty, an optimal device model can be selected based on a large number of observations. If the target device is positioned at several unlikely locations or it appears to make several improbable transitions, the current device model is probably incorrect.

FIG. 7 summarizes a method for estimating a target device's location by means of a selected device model. The method shown in FIG. 7 is self-explanatory in light of the foregoing discussion.

While the above-described embodiments relate to a positioning application, the invention is not limited to positioning. Rather the invention can be used with any application that uses a signal quality value measured from a wireless communication environment. Another example of such an application is network planning and/or maintenance. This application needs accurate signal quality observations at various known locations in a wireless communication network. Actually, the network planning and/or maintenance application benefits from the invention twice: first, the invention improves the reported signal quality observations from the network, by compensating for the differences between different mobile communication devices. Second, the invention improves the estimates of the locations at which the signal quality observations are made, as described earlier in connection with the positioning application.

It is readily apparent to a person skilled in the art that, as the technology advances, the inventive concept can be implemented in various ways. The invention and its embodiments are not limited to the examples described above but may vary within the scope of the claims.

We claim:

1. A method for using at least one signal quality parameter in an application, the method comprising:
    making observations using a target device of at least one signal quality parameter in a wireless communication environment;
    determining multiple device models that compensate for differences between inherent capabilities of different target devices to make observations of the at least one signal quality parameter;
    selecting, from among the multiple device models, a device model for the target device; and
    processing the observations made by the target device with the selected device model and applying the processed observations to an application, wherein the application is positioning application.

2. The method of claim 1, wherein the device model is selected based on statistical observations.

3. The method of claim 2, wherein the device model is selected based on a cumulative distribution function of signal quality values.

4. The method of claim 1, wherein the device model comprises a type-specific device model and a unit-specific device model.

5. The method of claim 1, further comprising determining multiple device models and selecting the device model providing the best match for the target device.

6. The method of claim 1, further comprising selecting the device model based on the target device's known location.

7. The method of claim 1, further comprising selecting the device model based on several estimated locations of the target device.

8. The method of claim 1, further comprising selecting the device model based on several estimated transitions of the target device.

9. The method of claim 5, further comprising caching the result of the selection for future sessions.

10. An arrangement for using at least one signal quality parameter in an application, the arrangement comprising:
    means for receiving observations of at least one signal quality parameter from a target device in a wireless communication environment;
    multiple device models for compensating for differences between inherent capabilities of different target devices to make observations fef of the at least one signal quality parameter;
    means for selecting, from among the multiple device models, a device model for the target device; and means for processing the observations made by the target device with the selected device model and for applying the processed observations to an application, wherein the application is a positioning application.

11. The arrangement of claim 10, wherein the device model is selected based on statistical observations.

12. The arrangement of claim 10, wherein the device model is selected based on a cumulative distribution function of signal quality values.

13. The arrangement of claim 10, wherein the device model comprises a type-specific device model and a unit-specific device model.

14. The arrangement of claim 10, further comprising means for determining multiple device models and for selecting the device model providing the best match for the target device.

15. The arrangement of claim 10, wherein the means for selecting selects the device model based on the target device's known location.

16. The arrangement of claim 10, wherein the means for selecting selects the device model based on several estimated locations of the target device.

17. The arrangement of claim 10, wherein the means for selecting selects the device model based on several estimated transitions of the target device.

18. The arrangement of claim 14, further comprising means for caching the result of the selection for future sessions.

* * * * *